(12) United States Patent
Frosik et al.

(10) Patent No.: US 7,664,259 B2
(45) Date of Patent: Feb. 16, 2010

(54) ENCRYPTION AND VERIFICATION USING PARTIAL PUBLIC KEY

(75) Inventors: Barbara Frosik, Arlington Heights, IL (US); Ronald Buskey, Sleepy Hollow, IL (US); Douglas Kuhlman, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 734 days.

(21) Appl. No.: 11/276,680

(22) Filed: Mar. 9, 2006

(65) Prior Publication Data
US 2007/0211893 A1    Sep. 13, 2007

(51) Int. Cl.
*H04L 9/30*    (2006.01)
(52) U.S. Cl. .................. 380/30; 380/44; 380/283; 380/285
(58) Field of Classification Search .......... 380/30, 380/283, 285, 277–281, 44–47
See application file for complete search history.

(56) References Cited

U.S. PATENT DOCUMENTS

| | | | |
|---|---|---|---|
| 4,731,841 A * | 3/1988 | Rosen et al. ............... 713/159 |
| 5,159,632 A | 10/1992 | Crandall |
| 5,271,061 A | 12/1993 | Crandall |
| 5,299,263 A * | 3/1994 | Beller et al. ............... 380/30 |
| 5,463,690 A | 10/1995 | Crandall |
| 6,141,420 A | 10/2000 | Vanstone et al. |
| 6,618,483 B1 * | 9/2003 | Vanstone et al. ........... 380/30 |
| 2001/0014153 A1 * | 8/2001 | Johnson ..................... 380/30 |
| 2004/0096064 A1 * | 5/2004 | Merzenich ................. 380/282 |

OTHER PUBLICATIONS

Lee W. Young, "PCT/US2007/061895 - PCT International Search Report and Written Opinion," WIPO, ISA/US, Commissioner for Patents, Alexandria, VA, USA, Feb. 22, 2008.
Philippe Becamel, "PCT/US2007/061895 - PCT International Preliminary Report on Patentability," The International Bureau of WIPO, Geneva Switzerland, Sep. 18, 2008.

* cited by examiner

*Primary Examiner*—Gilberto Barron, Jr.
*Assistant Examiner*—Shaun Gregory

(57) ABSTRACT

A method and device for using a partial public key in a cryptosystem. The cryptosystem may be based on a group, such as an elliptic curve over a finite field. The device includes a first memory for storing system parameters of the cryptosystem and a second memory for storing a portion of a public key of the cryptosystem. The device receives the complete public key, or the remainder of the public key, via communication with another device. The received portion of the public key is used to form a validated public key. A processor of the device uses the validated public key for encrypting messages and/or verifying signatures. The size of the second memory is reduced since only part of the public key is stored.

22 Claims, 4 Drawing Sheets

ENCRYPTION AND VERIFICATION USING PARTIAL PUBLIC KEY

BACKGROUND

Embedded Devices are increasingly being used to communicate sensitive information and are required to include security measures. Usually, embedded devices have limited resources as they are desired to be small. Therefore security mechanisms, such as encryption, authentication and verification, implemented on an embedded device need to be very efficient in terms of memory and computation requirements.

It is well known that data can be encrypted and then decrypted by utilizing a pair of keys, one of which is public and one of which is private. The keys are mathematically related such that data encrypted using the public key can be decrypted using the private key. It is also well known that a signature created with the private key can be verified utilizing the public key, and that anyone without the private key cannot generate a signature that will be validated.

The most well-known public key cryptosystems are those based on integer factorization and discrete logarithms in finite groups. It is also well known that by using computations in an elliptic curve defined over a finite field, it is possible to achieve an increased security level for the same key size or, conversely, the same security level for a shorter key.

Thus, elliptic curve encryption schemes are very suitable for the embedded environment, as the key sizes are much smaller than in the widely-used RSA schemes and require less memory. RSA is a registered trademark or trademark of RSA Security, Inc.

In an elliptic curve based public-key scheme, there are a number of system parameters that must be shared by all participants in order to make the scheme work. We shall term this information a set of system parameters. The set of system parameters typically consists of the definitional terms of the elliptic curve to be used, as well as a designated generator point G, represented by x- and y-coordinates. The elliptic curve defining parameters are typically designated a and b, where the group of points on the elliptic curve is defined by the equation $E_p(a,b)$ for which $y^2 = x^3 + ax + b$, modulo p or the group $E_{2^m}(a,b)$ for which $y^2 + xy = x^3 + ax^2 + b$, modulo $2^m$. The parameter p or m (which defines the finite field of definition) is also part of the set of system parameters. In another embodiment, the group is a finite field and the system parameters are the order of the field and the generator element. The system parameters can be programmed on the device during manufacturing and may be defined during design phase, as they can be shared by all users safely. In an embedded device, a memory (a first memory) holding the system parameters should be tamper resistant. An example of a temper resistant memory is unchangeable ROM.

In addition to the system parameters, an embedded device must store a public key consisting of a point on the elliptic curve, P, defined by x and y coordinates. The public key (P) is a scalar multiplication of that generator point by a private key, n. The corresponding private key may be held by a signing or decrypting party, not the embedded device. The point P, however, has to be programmed into the device later, when the public-private key pair is generated, to ensure secure key distribution process and to allow for multiple users with different keys on the same system. This programming will be done outside of the device manufacturer environment, and therefore the technology supporting this capability must be different. Memory must be provided that is one-time programmable in a post device-manufacturing environment. This type of memory is very expensive with current technology.

US patent "Elliptic Curve Encryption" U.S. Pat. No. 6,618,483B1 explores a concept of reducing transmission bandwidth by transmitting only one coordinate plus one bit of a public key in elliptic curve encryption. This scheme is used in a system where the encrypting party uses a key provided by a trusted party. The encrypting party is capable of recovering the complete public key, since the given information, one coordinate plus one bit of information about the other coordinate is sufficient for an elliptic curve point reconstruction.

Other techniques for using partial key information exist include, for example, hashing the key and storing only the hash of the key or a portion of the hash of the key. However, this technique requires additional functionality on the device, namely that of a cryptographically strong hash (for RSA use).

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
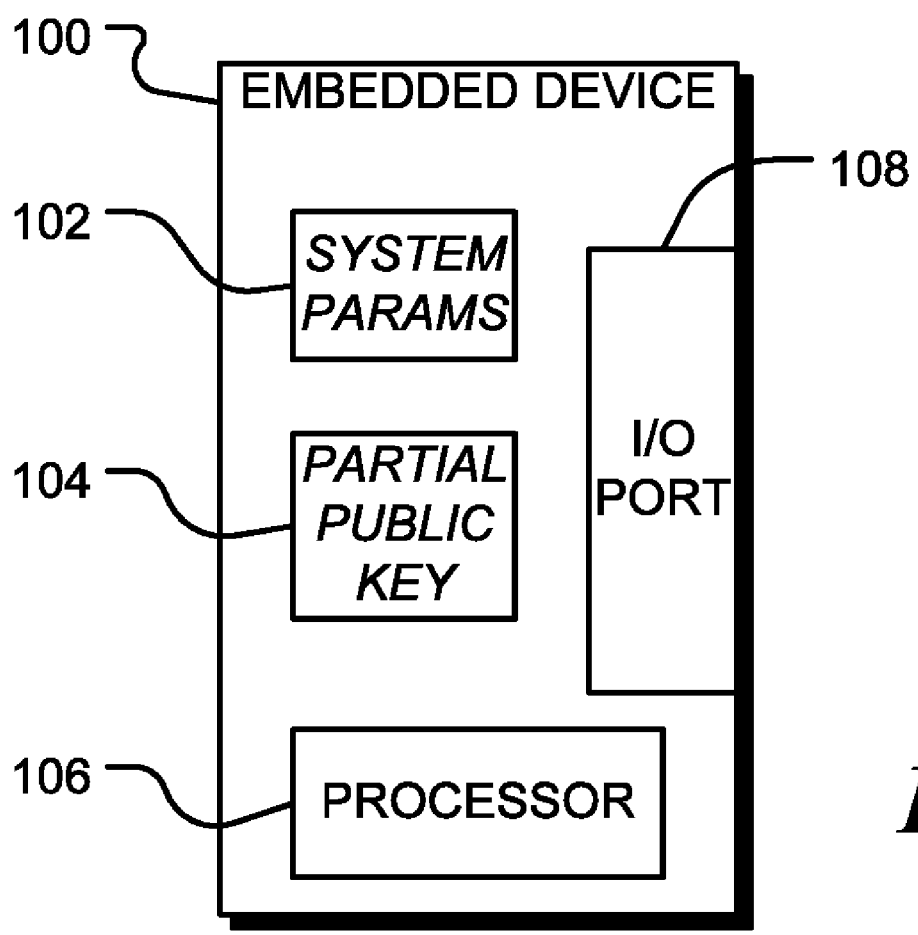
FIG. 1 is a diagrammatic representation of an embedded device consistent with certain embodiments.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

For any cryptosystem built on a group, both system parameters and the public key will be required for operation. For clarity of exposition, we describe an embodiment, where the group is an elliptic curve over a finite field. However, cryptosystems built on any group are a straightforward extension of the ideas provided. Furthermore, embodiments over a cryptosystem in general are possible. The system parameters are chosen arbitrarily for the entire system, while the public key (P) is a scalar multiplication of that generator point by a private key n, unique to each user. We note that a user may be a corporation, a line of products, or a single person, for example. Many public keys $P_1, P_2, \ldots P_n$ can be derived from the same generator point G and other system parameters. The present invention relates to the storage of the public key, P. However, it is recognized that both the point P and the system parameters are needed for operation.

The system parameters, comprising the elliptic curve parameters, the finite field of definition, and the generator point G, can be programmed on the device during manufacturing and it is possible to define that point during design phase, as it can be shared by multiple users with different keys safely. The memory holding this point should be tamper resistant. The public key (the P point) however, has to be programmed into the device later, when the public-private key is generated, to ensure a secure key distribution process and to allow for multiple users of the same system. This programming will be done outside of the device manufacturer environment and therefore the technology supporting this capability may be different. Memory must be provided that is one-time programmable in a post-device manufacturing environment. This type of memory is very expensive with current technology.

In accordance with an aspect of the present invention, the embedded device operates as an encrypting or verification party using the designated public key P. The full key is not stored on the device, nor is enough information to regenerate the key stored. Only a partial key, a portion of the public key value P, is stored. In an exemplary embodiment, the partial key value stored is half the bits of the x-coordinate of P. The partial key information is used to validate the full key (x- and y-coordinates of P) supplied by an untrusted source. In another embodiment the partial key value stored is half the bits of the x-coordinate of P. The remaining part of the full public key is supplied by an untrusted source. The untrusted source could be regular memory on the device or input from an outside device. An advantage of storing only the partial key is a 75% saving on storage of the special feature memory with no security impact and no additional functionality required. The full key is not retrieved from the partial key but is obtained from an untrusted source and validated against the securely stored partial key. In one embodiment, where the full public key is supplied from an untrusted party, the validation consists of checking if the portion of the received public key common to the stored portion exactly matches the stored portion. Security may be improved by checking if the received public key is a point on the elliptic curve. In the alternate embodiment, when only the portion of the public key not stored on the device is supplied from a party that is not trusted, the validation typically consists of checking whether the public key composed out of stored and received portions, is a point on the elliptic curve. In either case, the resultant public key will exactly match the stored portion in those bits.

FIG. 1 is a diagrammatic representation of an embedded device consistent with certain embodiments. The embedded device 100 includes a first memory 102 for storing the system parameters for an elliptic curve system and second memory 104 storing a portion (half for example) of a public key. This may be, for example, a portion of the x-coordinate of a point P on an elliptic curve corresponding to a public key. The stored portion of the x-coordinate of P suffices to validate the public key point P. The embedded device also includes a processor 106 and an I/O port 108.

The first memory 102 may be tamper-resistant memory. This memory may be programmed during device manufacture. ROM code is an example of this type of memory. The second memory 104 may be memory that is one-time programmable outside of the manufacturing environment. This memory is typically expensive, so minimizing the amount of memory reduces the cost of the device. An example of a one time programmable, tamper-resistant memory is a laser fuse.

The part of x-coordinate of P may additionally serve as an identifier of the embedded device 100. The system can use other schemes to identify the device. The device needs to be identified when the public key is supplied and when the entity owning the private key needs to determine the corresponding private key to proceed with an operation such as decryption or signing.

This approach avoids the requirement for hash function calculation on the embedded device, which would increase the price of the desired functionality.

The complete public key can be supplied by the infrastructure, either by the entity owning the private key or a third party. It might alternatively be stored in insecure (inexpensive) memory on the device itself. The stored part of the public key should contain enough information to confirm the correctness of the supplied key with the assurance level corresponding to the security level of the overall system. A communication protocol can be defined for the system in order to provide the entity with the complete public key. The order of events, as well as the initiator role will be different in the cryptography and verification schemes; however in both of the schemes the supplied public key must match the partial public key, if fully supplied and must satisfy the elliptic curve equation. In this arrangement the entity owning the partial public key identifies itself to the party that provides the entire key, so that the correct public key is communicated and also identifies itself to the party that owns the corresponding private key, so that the correct private key is used for decryption or signing operations. The portion of the key owned by the entity is a sufficient identity and can be used in the protocol as the entity identifier. Alternatively, the device can identify itself using existing techniques, and the owner of the private key maintains a database to match private keys and devices. Further alternatives for matching the private key to the partial public key can be used by those skilled in the art.

In one embodiment, the partial x-coordinate of the public key is stored in the device in tamper-resistant memory. In another embodiment, this tamper-resistant memory is one time programmable.

In one embodiment, the length of the key portion corresponds to the security level of the system. For example, for a 160-bit security level system, the length of the key portion is 160 bits. In other embodiments, the length of the key portion stored may be lower, to sacrifice security for cost savings.

The stored portion of the public key may be used to identify the public key to be sent. In another embodiment, only a portion of the stored portion of the public key is used for identification. Other methods of identifying device to the system are possible as well; however, using the portion of the public key simplifies the system.

The partial key scheme applies to both encryption and verification schemes. The protocols for communicating the complete public key in the both cases are as follows.

Figure 2:
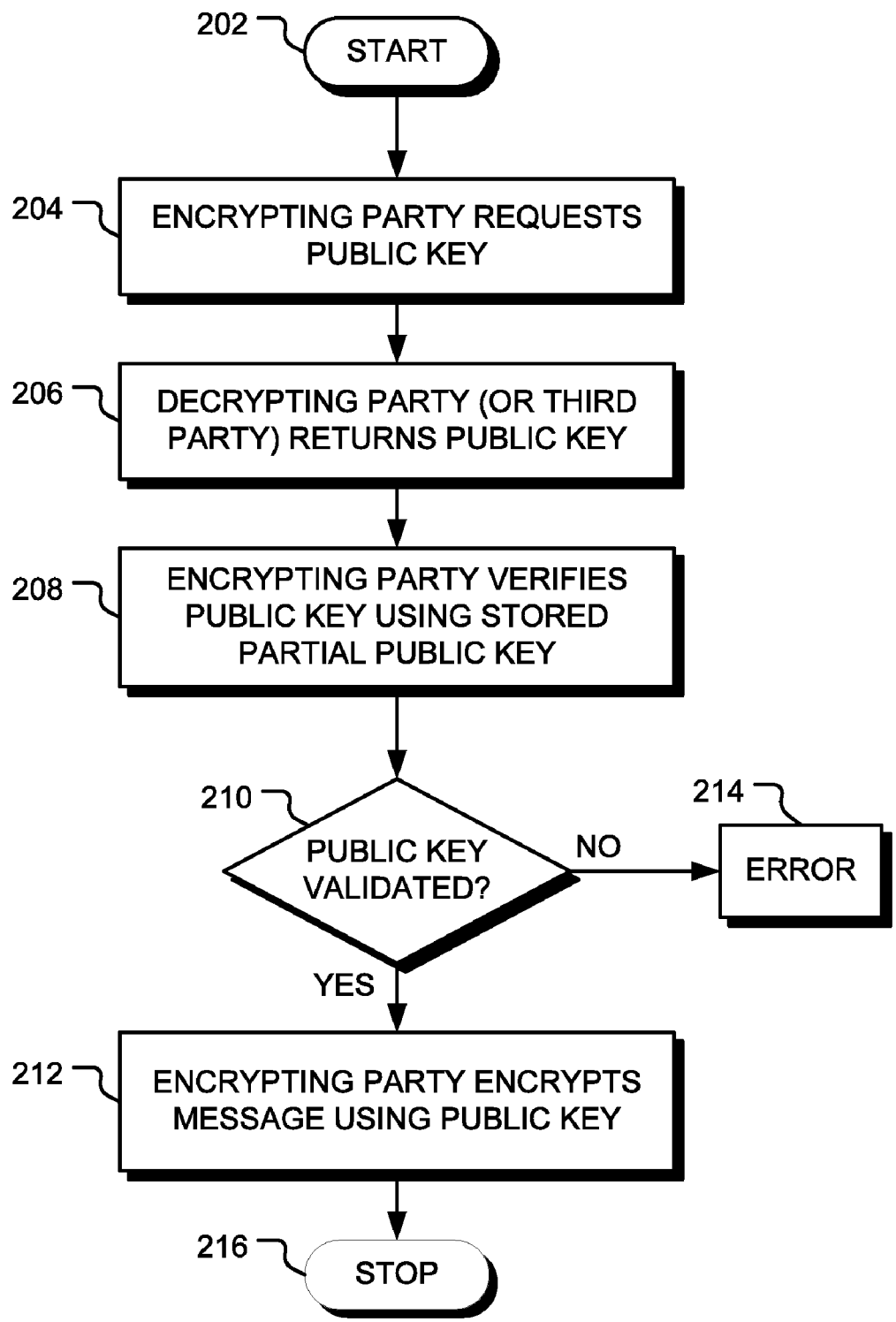
FIG. 2 is a flow chart of a method for encrypted communication consistent with certain embodiments.

The protocol for communicating a public key in an encryption scheme. FIG. 2 is flow chart of a method for encrypted communication consistent with certain embodiments. The entity with the encryption function, namely the embedded device, is the initiator in relation to the decrypting party. Note that there may be several different scenarios, where the entity starting the process can be the embedded device or the trusted party with a private key or a third party. However, the initiator in an encryption/decryption algorithm is the party that performs the first operation of interest—the encryption, which is the embedded device. Referring to FIG. 2, following the start at block 202, the encrypting entity, owning a partial public key, requests the complete public key from the infrastructure (either the decrypting party or a third party) at block 204. The infrastructure selects the public key corresponding to the partial public key and returns the complete public key at block 206. In another embodiment, upon reception of the complete key the entity validates the received value with the owned portion at block 208 by comparing the available portion. This step does not take place if only the remaining portion of the public key is supplied. In addition, the entity may verify that the point's coordinates satisfy the correct elliptic curve equation. For example, for curve $E_p(a,b)$ the y-coordinate must satisfy the equation $y^2=x^3+ax+b$, modulo p. If the public key is validated successfully, as depicted by the positive branch from decision block 210, the entity encrypts the message at block 212 using the complete public key, P, it received and validated and the system parameters. If the public key is not validated, as depicted by the negative branch from decision block 210, the process terminates in an error at block 214. The process terminates at block 216 once the communication is completed.

A message point M is encrypted using standard mechanisms. That is, the encrypted message is the pair of a point and a number $C=[kG, M*(kP\rightarrow x)]$, where k is a random integer chosen by the encrypting party. The private key n is not known by the encrypting party. The message is decrypted by the trusted entity with a secret key by multiplying the point (kG) by the private key n to yield the point nkG. The next step is to multiply the inverse of the x-coordinate of the point nkG by the number included in the cipher. It is known that the message can only be recovered if the decrypting party has knowledge of the private key n.

Figure 3:
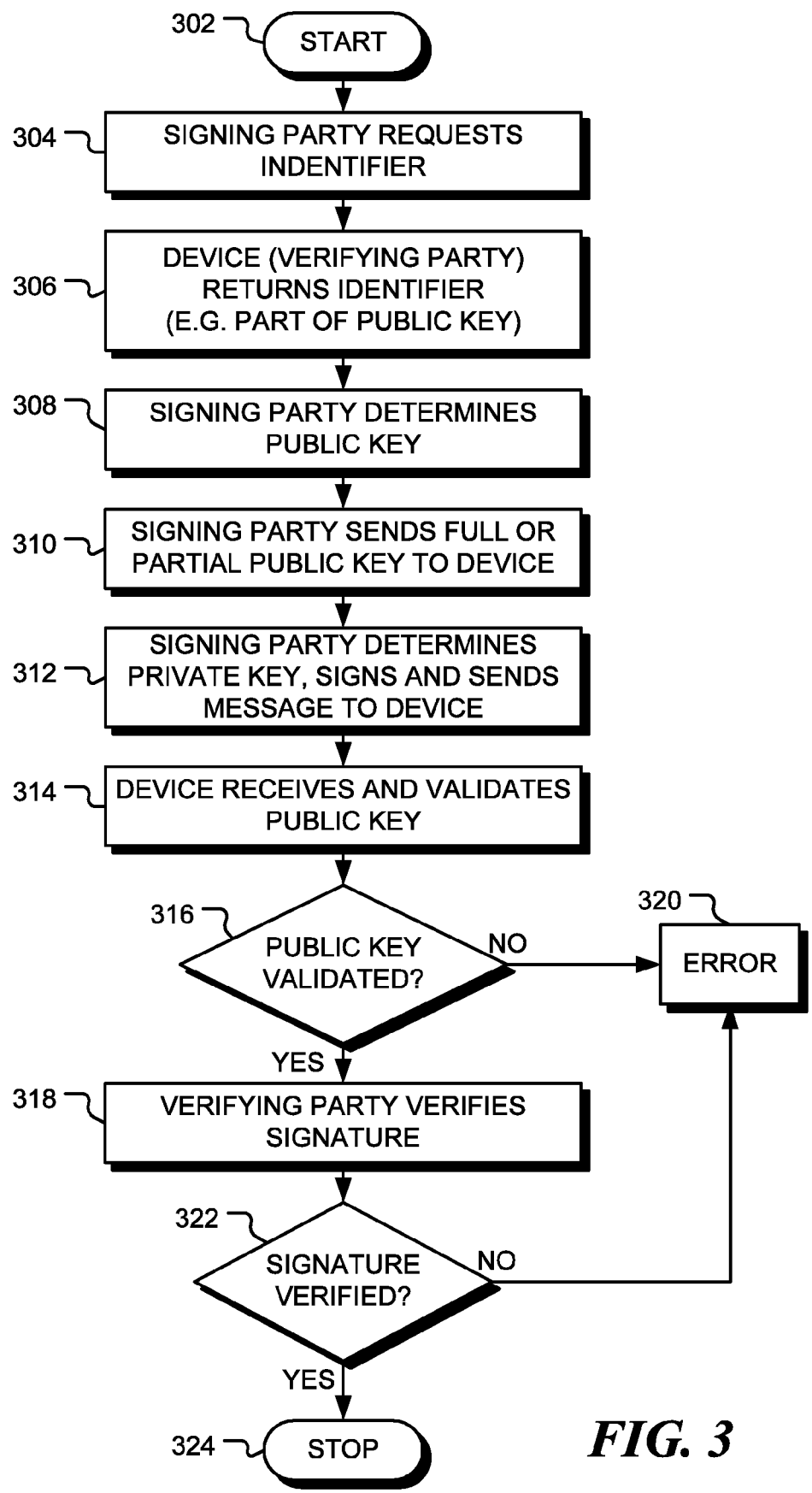
FIG. 3 is a flow chart of a method for signature verification consistent with certain embodiments.

The protocol for communicating a public key in a signature verification scheme. FIG. 3 is a flow chart of a method for signature verification consistent with certain embodiments. Following the start at block 302, the signing party that holds the private key initiates the transaction by requesting an identifier of the verifying party (the embedded device). Note that there may be several different scenarios, where the entity starting the process can be either the embedded device or the trusted party with a private key or a third party. However the initiator in a sign/verify exchange is the party that performs the first operation of interest—the signing, which is the entity with private key. Depending on the system, the signing entity can be coupled with the verifying party by default, or, in a multi-key-pair arrangement it might need information about the other party, so the correct private key is used when signing. In the latter setting, the signing party requests the verifying party identifier.

At block 306 the verifying party returns its identifier. In one embodiment the identifier may be the partial public key. Note that other mechanisms to identify the corresponding party may be implemented as alternatives. The message being signed can be originated by the signing party or can be sent to the signing party by verifying party as a challenge in the challenge-response algorithm. At block 308 the signing party determines appropriate public key corresponding to the identifier and, at block 310 sends the public key, or at least the complementary portion of it, to the device (the verifying party). At block 312, the signing party determines the private key corresponding to the device that identified itself with the verifying party identifier. The signing party then signs the message using the private key and sends the signed message to the verifying party.

At block 314 the verifying party determined the validity of the public key, received from the signing party or formed by combining the received portion of the public key with its stored portion, by checking it against the stored portion. If the public key is validated, as depicted by the positive branch from decision block 316, the verifying party verifies the signature, at block 318, using the validated public key. If the public key is not validated, as depicted by the negative branch from decision block 316, the verifying party rejects signature and an error is flagged at block 320. At block 318, the verifying party checks the signature. If the signature is verified, as depicted by the positive branch from decision block 322, the process terminates at block 324. If verification of the signature fails, as depicted by the negative branch from decision block 322, the process terminates with an error at block 320.

The order of validation of the key and verification of the signature processes is flexible, however in one embodiment, the validation precedes the verification.

In a further embodiment, a third party is utilized to supply the public key while the signing party provides the signature. A yet further embodiment has the full public key stored on the device in an inexpensive (insecure) memory.

Various techniques for signature generation and verification will be obvious to those of ordinary skill in the art. An example of the elliptic curve digital signature protocol includes the following steps:

(1) hashing a message M to a value x, such as: $H(M)=x$;
(2) deriving a member of the group, point Q, by multiplying generator point G by a random number k: $Q=kG$;
(3) generating the signature consisting of two numbers, the first number r being result of modulo (%) q operation on x-coordinate of point Q, the second number being a product of inverse random number k and sum of the hash x and private key u multiplied by the first number r, where q is an order of the elliptic curve. The signature is $S(x)=(r, (x+ur)k^{-1})\%q)$, where $r=kG\rightarrow x$.

The corresponding verification mechanism of the signature $S(x)=(r, y)$ includes the following steps:

(1) deriving value $i=xk/(x+ur)$ by multiplying hash x by the inverse of the second number of signature: $i=y^{-1}x\%q$
(2) deriving value $j=rk/(x+ur)$ by multiplying the first number of the signature, r, by the inverse of the second number of the signature: $j=y^{-1}r\%q$
(3) deriving a member of the group, point Q', by adding the point obtained by multiplying generator point G by the value i and the point obtained by multiplying public key point P by value j: $Q'=iG+jP$. If the verification is successful point Q' equals point Q, based on the following equations: $Q'=iG+jP=[xk/(x+ur)]G+[rk/(x+ur)]P=[xk/(x+ur)]G+[urk/(x+ur)]G=[(xk+urk)/(x+ur)]G=kG=Q$.
(4) Verifying that point Q' equals point Q by checking that x-coordinate of point Q' equals the first number r of signature S. Accept if $(Q'\rightarrow x)\% q=r$.

Storing only a partial public key, rather than the complete key, reduces the amount of expensive memory such as one-time programmable and tamper resistant memory. Normally the requirement for the size of that memory is to hold an elliptic curve point, consisting of both the x and y coordinates. The memory can be limited to a quarter of the size of the point on the elliptic curve and the system will still hold the same security level. Additionally, no extra functionality is required on the device doing the verification or encryption other than the public-key operations of elliptic curves (namely, elliptic curve multiplication). This provides a significant cost-saving in manufacture and deployment of systems with these requirements.

To break the resultant cryptosystem, a point must be found on a given elliptic curve with a prescribed portion of the x-value fixed and to be a known or calculable multiple of a fixed base point (the generator point). This is known to be a hard problem. A Hamming sphere of allowed points around the correct public-key can be found. However, finding the discrete logarithm of any one of those points is as difficult as finding the discrete logarithm of the actual public-key value. This means the overall difficulty is only one bit less than solving the original discrete logarithm problem.

The use of a partial public key has many applications in devices with secure architectures. For example, encryption and verification can be used to protect a gateway access point, such as the JTAG port, of an embedded device. A partial public key may also be stored on a smart card, for example.

Figure 4:
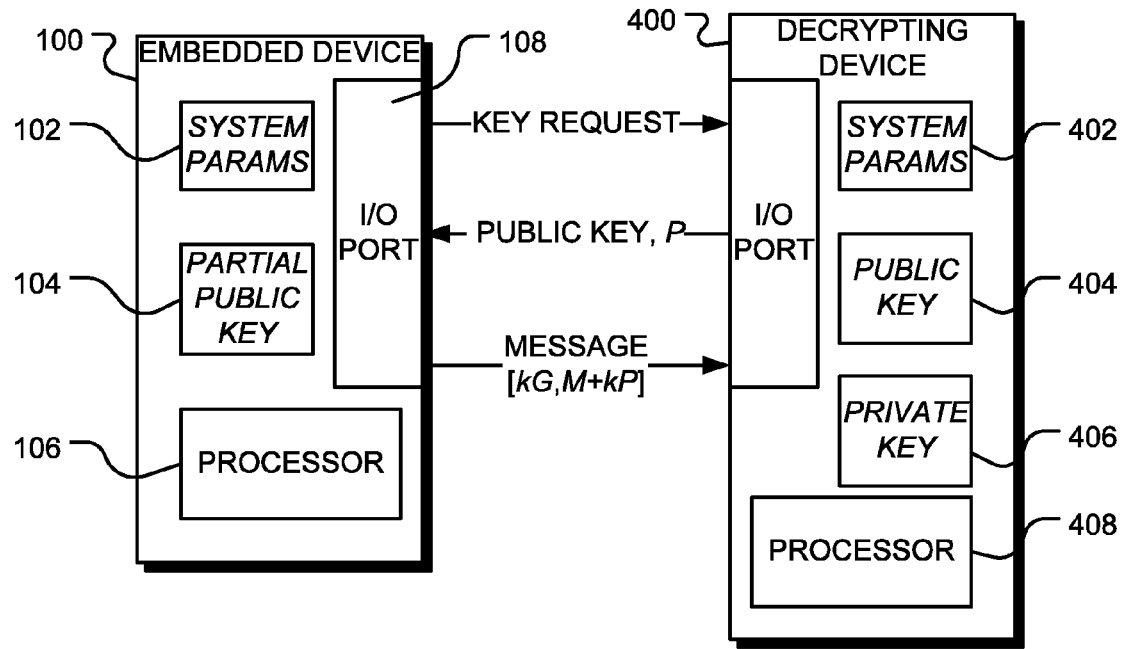
FIG. 4 is a diagrammatic representation of a secure communication using an embedded device consistent with certain embodiments.

FIG. 4 is a diagrammatic representation of a secure communication between an embedded device consistent with certain embodiments and another entity. Referring to FIG. 4, the embedded device 100 initiates the communication by sending a public key request to either the decrypting device 400 or a third party using the I/O port 108. The device typically identifies itself to the party supplying the key. In this embodiment, the embedded device receives the complete public key, P, that was stored on the decrypting device (or a third party) in memory 404, and checks it against the partial x-coordinate of the key stored in the second memory 104. Additionally the device checks that the coordinates of point P satisfy the elliptic curve equation. In the case when only the missing portion of public key is received from a party that is not trusted, the validation of the public key constrains of the later step only. If the public key P is validated, the embedded device operates processor 106 to encrypt the message to be transmitted. The processor 106 uses the complete public key P, the (public) system parameters stored in the first memory 102, and a random number k. The encrypted message is then passed to the decrypting device 400. The decrypting device decrypts the message using processor 408. The processor 408 of the decrypting device utilizes the private key stored in memory 406.

Figure 5:
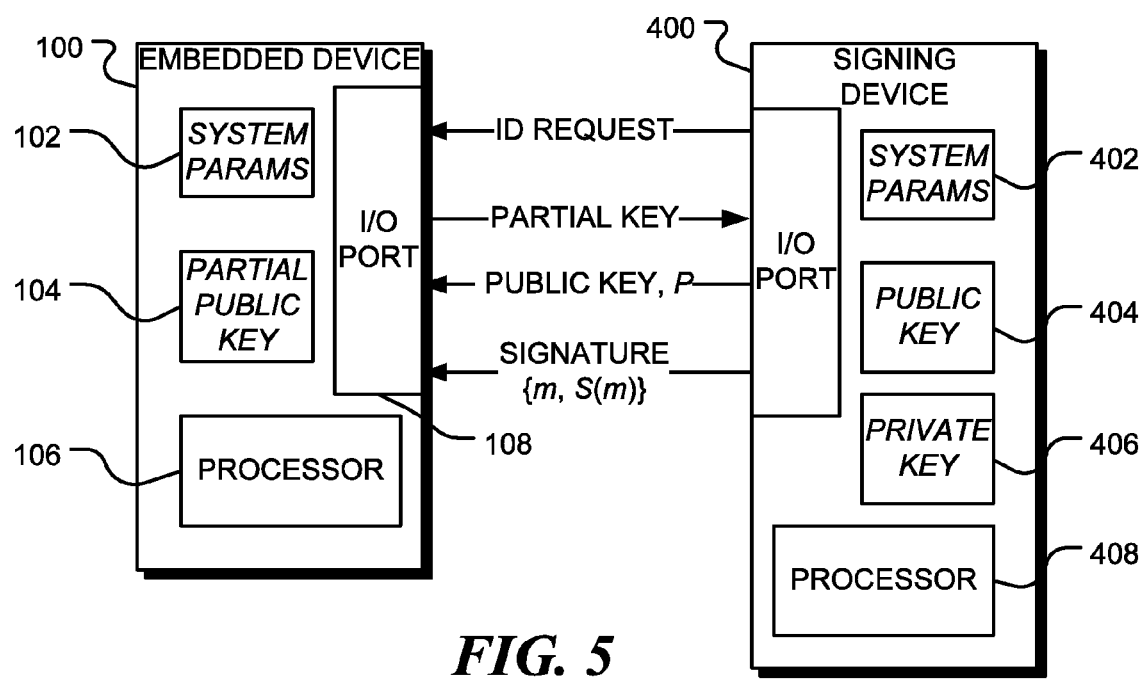
FIG. 5 is a diagrammatic representation of signature verification by an embedded device consistent with certain embodiments.

FIG. 5 is a diagrammatic representation of signature verification by an embedded device consistent with certain embodiments. Referring to FIG. 5, the signing device 400 initiates the verification process by sending an identifier request to the embedded device 100 (the verifying party). The embedded device 100 responds by sending its identifier, which could be a partial public key stored in the second memory 104. The signing device 400 uses the processor 408 to sign a message with a private key that corresponds to the device identifier and then sends the signed message to the embedded device 100. The processor 408 uses system parameters stored in memory 402 and the private key of the signing device stored in memory 406. The embedded device receives the public key from either the signing device or a third party. The signing party (or the third party) passes the public key P stored in memory 404 to the embedded device. The embedded device 100 validates the received key by optionally validating it against the stored portion in memory 104 and ensuring that the point is on the elliptic curve. Finally, the embedded device 100 uses processor 106 to verify the message using the complete public key P and the system parameters stored in the first memory 102.

The processor, 106 in FIG. 4 and FIG. 5 may be implemented using hardware components such as special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments. Separate processors may be used for encrypting and verifying; or the same processor may be used for both operations.

Those of ordinary skill in the art will recognize that the present invention has been described in terms of exemplary embodiments based upon use of exemplary encryption and verification schemes. However, the invention should not be so limited, since the present invention could be utilized by other encryption and verification schemes.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A device comprising:
    a first memory operated to store a set of system parameters of a cryptosystem over a finite field, wherein a public key of the cryptosystem over the finite field comprises at least two elements of the finite field;
    a second memory operated to store a first portion of the public key of the cryptosystem, wherein the first portion of the public key comprises fewer than all of the bits of each of the at least two elements of the finite field;
    a port operated to receive at least a second portion of the public key of the cryptosystem, the first and second portions of the public key forming a validated public key of the cryptosystem, wherein the validated public key of the cryptosystem comprises all of the bits of each of the at least two elements of the finite field; and
    a processor responsive to the validated public key and the set of system parameters of the cryptosystem.

2. A device in accordance with claim 1 wherein the cryptosystem is based on a group comprising an elliptic curve over the finite field, wherein the public key of the cryptosystem comprises an x-coordinate and a y-coordinate, and wherein the set of system parameters comprises a set of elliptic curve parameters, a finite field of definition, and a generator of the group.

3. A device in accordance with claim 1 wherein the first memory comprises a tamper resistant memory.

4. A device in accordance with claim 1 wherein the second memory comprises a memory that is programmable only once and is tamper resistant.

5. A device in accordance with claim 1 wherein the port is operated to receive the second portion of the public key of the cryptosystem from another device.

6. A device in accordance with claim 1 further comprising:
    a third memory operated to store the second portion of the public key;
    wherein the port is operated to receive the second portion of the public key of the cryptosystem from the third memory.

7. A method for a device having a first memory and a second memory to encrypt a message, the first memory storing a set of system parameters of a cryptosystem over a finite field, wherein a public key of the cryptosystem over the finite field comprises at least two elements of the finite field, the method comprising:
    the device issuing a request for a public key of a cryptosystem;
    the device receiving at least a portion of the public key of the cryptosystem;
    the device validating the public key using the received portion of the public key and a stored portion of the public key stored in the second memory,
wherein the stored portion of the public key comprises fewer than all of the bits of each of the at least two elements of the finite field; and
    the device encrypting the message using the validated public key and the set of system parameters stored in the first memory of the device.

8. A method in accordance with claim 7 wherein the set of system parameters comprises elliptic curve parameters, a finite field of definition, and a generator of the group.

9. A method in accordance with claim 8 wherein the public key comprises an x-coordinate and a y-coordinate and wherein the stored portion of the public key comprises part of the x-coordinate of the public key.

10. A method in accordance with claim 8 further comprising:
the device verifying that the public key is on the elliptic curve.

11. A method in accordance with claim 7 wherein validating the public key comprises matching the stored portion of the public key with the corresponding portion of the received public key.

12. A method in accordance with claim 7 wherein the received portion of the public key comprises a portion of the public key that is complementary to the stored portion of the public key.

13. A method in accordance with claim 7 wherein issuing the request for the public key of the cryptosystem comprises the device sending at least a part of the stored portion of the public key.

14. A method for a device having a first memory and a second memory to verify a signing device using a cryptosystem based on a group, the first memory storing a set of system parameters of the cryptosystem over a finite field, wherein a public key of the cryptosystem over the finite field comprises at least two elements of the finite field, the method comprising:
the device receiving an identifier request;
the device issuing a identifier in response to the identifier request;
the device receiving at least a portion of a public key of the cryptosystem;
the device validating the public key using the received portion of the public key and a stored portion of the public key stored in the second memory, wherein the stored portion of the public key comprises fewer than all of the bits of each of the at least two elements of the finite field;
the device receiving a signature from the signing device; and
the device verifying the signature using the validated public key and the set of system parameters stored in the first memory.

15. A method in accordance with claim 14 wherein the group is an elliptic curve over a finite field and wherein the set of system parameters comprises a set of elliptic curve parameters, a finite field of definition, and a generator of the group.

16. A method in accordance with claim 14 wherein the received portion of the public key comprises a portion of the public key not stored in the second memory of the device.

17. A method in accordance with claim 14 wherein the identifier comprises at least a part of the stored portion of the public key.

18. A method in accordance with claim 14 wherein the portion of the public key is received by the device from a device other than the signing device.

19. A method in accordance with claim 14 wherein the identifier request and the public key are received by the device from the signing device.

20. A device in accordance with claim 2 wherein the first portion of the public key comprises half of the bits of the x-coordinate and no bits of the y-coordinate.

21. A method in accordance with claim 9 wherein the stored portion of the public key comprises half of the bits of the x-coordinate and no bits of the y-coordinate.

22. A method in accordance with claim 15 wherein the public key comprises an x-coordinate and a y-coordinate and wherein the stored portion of the public key comprises half of the bits of the x-coordinate and no bits of the y-coordinate.

* * * * *